2,712,017
Patented June 28, 1955

2,712,017

SULFURIC ACID HALF ESTERS OF INDANTHRONES

William B. Hardy, Bound Brook, and Harry E. Westlake, Jr., Somerville, N. J., assignors to American Cyanamid Company, New York, N. Y., a corporation of Maine No Drawing. Application May 21, 1952,
Serial No. 289,201

8 Claims. (Cl. 260—264)

This invention relates to new dyestuffs having the following formula:

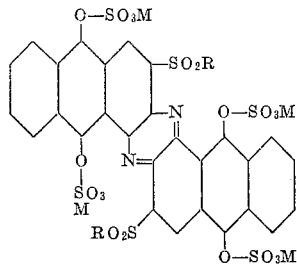

wherein R is an alkyl radical of not more than four carbon atoms and M is a cation.

The vat dyestuff indanthrene, 1,2,1′,2′-anthraquinone N,N′-dihydroazine is a blue dyestuff of great commercial importance. It also is a parent member of a series of vat dyestuffs having the indanthrone ring structure. These dyestuffs are for the most part reddish blues to pure blues; while some greenish blues or greens have been produced by introducing hydroxyl or amino groups, their fastness properties are extremely poor. There has been for many years a want for a vat dyestuff of bright greenish blue, or aqua, shade of the indanthrene series, which would be fast both to light and to oxidation by hypochlorite. Preferably such dyestuffs should be in the form of their leuco sulfuric acid half esters so that dyeing can be effected without the use of a highly alkaline dye vat. This is particularly important because many indanthrene dyestuffs are peculiarly sensitive to overreduction at elevated temperatures and present a considerable problem when dyed from an ordinary dye bath or vat. The problem is solved by the dyestuffs of the present invention as it has been found that the alkyl sulfonyl groups in the 3 and 3′ position exert an unusual effect. In the first place, the alkyl sulfonyl group imparts to the new dyestuffs great fastness to light and oxidation. Secondly, it has an extraordinary effect on the shade. Ordinarily, the introduction of alkyl sulfonyl groups into vat dyestuffs lightens the shade obtained. In other words, this group has a hypsochromic effect. In the dyestuffs of the present invention, the alkyl sulfonyl group has exactly the opposite effect on the shade. That is to say, it has a bathochromic effect and deepens the shade. The reason for this anomalous behavior of the alkyl sulfonyl group in the dyes of the present invention has not as yet been determined and the present invention is therefore not limited to any theoretical explanation of this unusual effect.

The dyestuffs of the present invention not only have excellent fastness to light and oxidation but are bright greenish blues which shades have hitherto been unmatchable by any blends of leuco sulfuric acid half esters of known vat dyes. Thus, for example, mixtures of the half esters of 3,3′-dichlorindanthrene and dimethoxydibenzanthrone which have been used in the past fail to reproduce the desired bright greenish blue shade and the fastness properties of the mixture leaves much to be desired.

The present invention is not limited in its broader aspects to any particular process of making the new dyestuffs. In a more specific aspect, however, a new and improved process is described and claimed. In general, this preferred process involves four steps starting from 2-acylamino-3-bromoanthraquinone. The first two steps transform the starting material first into 2-acylamino-3-mercaptoanthraquinone alkylates, and then oxidizes to the 2-acylaminoanthraquinonyl-3-alkyl sulfones. These steps and the new intermediate products produced are not claimed in the present application, but form the subject matter of our co-pending application, Serial No. 289,203, filed May 21, 1952. The next steps involve the conversion of anthraquinonyl alkyl sulfones into the sulfuric acid half esters of the corresponding leuco quinones followed by hydrolysis of the acyl group. These steps and the new intermediate products that are produced are also not claimed in the present application but form the subject matter of our copending application, Serial No. 289,202, filed May 21, 1952. Finally the 2-aminoanthraquinonyl-3-alkyl sulfones leuco disulfuric esters are ring closed to produce the indanthrene ring. This step is effected in the presence of oxidizing agents, preferably nickel dioxide. General processes of ring closures using nickel dioxide form the subject matter of the copending application of Hardy and Fortenbaugh, Serial No. 271,868, filed May 15, 1952, now United States Patent No. 2,659,727. The use of the preferred oxidizing agent is included in the present invention only in the connection with the production of the new dyestuffs claimed herein. Other oxidizing agents, while not as desirable as nickel dioxide, may also be used in the process step. Typical of such other oxidizing agents are lead dioxide, alkaline metal ferricyanides, etc. The sequence of steps by which the intermediates are produced and finally the indanthrene dyestuffs of the present invention are formed and can be represented by the following generalized reaction series:

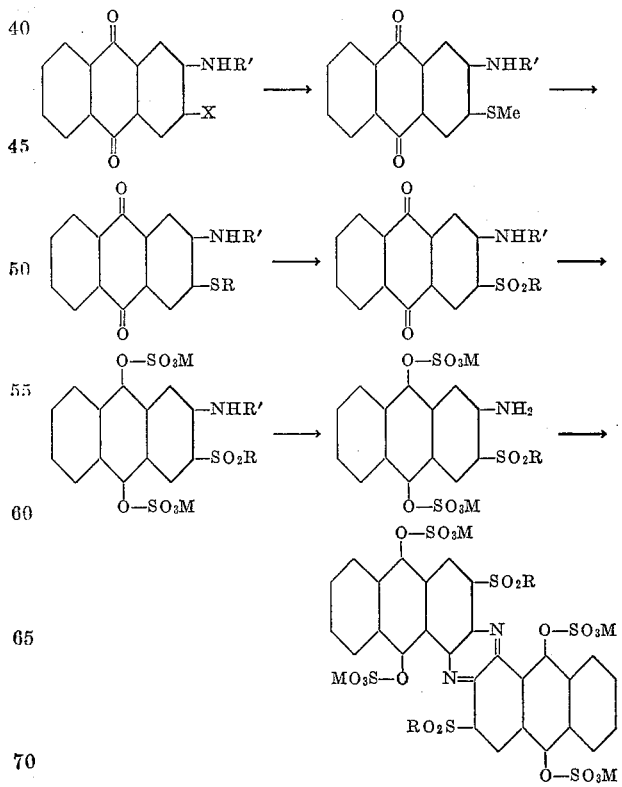

In the above formulae, X represents halogen, Me represents a metallic ion, R an alkyl radical of not more than four carbon atoms, R' an acyl group and M a cation.

In the final dyestuffs of the present invention, the alkyl group may be any of those having not more than four carbon atoms, such as methyl, ethyl, propyl, isopropyl, butyl, isobutyl, and secondary butyl. The cation may be hydrogen, alkali metal such as sodium, potassium or lithium, alkaline earth metal such as calcium, or an organic base, such as tertiary or quaternary nitrogen compounds. These cations are conventional in the art of sulfuric acid half esters of leuco vat dyestuffs, and in this respect the present invention does not depart from the cations commonly used with sulfuric acid half esters of other vat dyestuffs.

The invention will be illustrated in greater detail in the following examples in which the parts are by weight unless otherwise specified:

*Example 1*

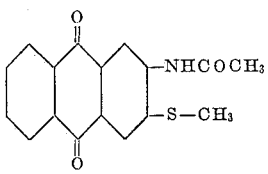

A mixture of 83 parts of sodium sulfide, 21.2 parts of sulfur, 360 parts of pyridine, and 36 parts of water is stirred at 75° C. until a complete solution is obtained. To this is added 68.6 parts of 2-acetylamino-3-bromo-anthraquinone. The mixture is stirred at 90° until the reaction is complete and then is drowned in 2000 parts by volume of water. The drowned mixture is distilled until the distillate temperature reaches 100° C. The hot residual solution is treated with 120 parts of sodium chloride. When the mixture is cooled to 20° C., the sodium mercaptide precipitates. This is filtered and washed with 400 parts by volume of 20% brine, and then reslurried in 2000 parts by volume of water. 80 parts of soda ash is added to the slurry, which is then stirred at room temperature while 72 parts by volume of dimethyl sulfate is added gradually. On standing a yellow precipitate appears which is filtered, washed neutral and dried. It may be recrystallized from dichlorobenzene to give green-yellow crystals of 2-acetylaminoanthraquinonyl-3-methyl sulfide.

*Example 2*

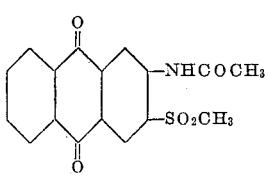

A mixture of 74 parts of 2-acetylaminoanthraquinonyl-3-methyl sulfide and 700 parts by volume of glacial acetic acid is stirred while a solution of 100 parts of potassium permanganate in 30 parts of hot water is added. The permanganate is washed into the mixture with an additional batch of 700 parts by volume of acetic acid. The mixture is stirred at the boil until the reaction is substantially complete. It is then cooled to 70° and a quantity of sodium bisulfite is added sufficient to decompose the precipitated manganese dioxide. 150 parts by volume of acetic anhydride is added and the mixture is heated at the boil until the reaction is substantially complete. It is drowned in 2000 parts by volume of ice and water. The precipitated 2-acetylaminoanthraquinone-3-methyl sulfone is filtered, washed neutral and dried. The sulfone can be recrystallized from dichlorobenzene, giving pale yellow crystals.

*Example 3*

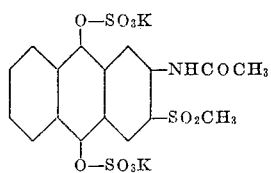

To 248 parts of alpha picoline there is added gradually below 30° C. 89.6 parts of chlorsulfonic acid. The mixture is stirred and then warmed to 40° C. being kept at this temperature until reaction is substantially complete. A finely divided mixture of 70 parts of 2-acetylamino-anthraquinonyl-3-methyl sulfone and 26.8 parts of finely divided iron is added gradually. The mixture is then stirred at 40° C. until reduction of the quinone group and sulfation is effected. The mixture is then drowned in a solution of 191.5 parts of sodium carbonate in 1150 parts by volume of water. The alpha picoline is removed by vacuum distillation, the remaining reaction mixture filtered, and the precipitate washed with hot water. The filtrate is then salted to 23% potassium chloride concentration by volume and cooled to 20° C. A bright yellow potassium salt of a sulfuric acid half ester precipitates and is filtered and washed with a saturated alkaline potassium chloride solution and then with methanol; thereupon, it is dried under a vacuum.

*Example 4*

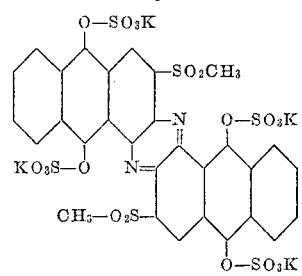

52 parts real of the product produced by Example 3 is heated in 490 parts by volume of water and 44 parts by volume of 50% sodium hydroxide solution until hydrolysis is complete. Black nickel dioxide prepared from 64 parts of nickelous chloride is then added to the reaction mixture with stirring at 80° C. The mixture is filtered hot and the cake washed with hot water. The filtrate is then concentrated, preferably under vacuum, to a volume of about 400 parts and sufficient potassium chloride added to make a concentration of 15% by volume. Thereupon the mixture is cooled, the precipitate filtered and washed with saturated potassium chloride forming a brown crystalline product which is soluble in water and fluoresces green when diluted. The product can be further purified by resalting from water with potassium chloride. When dyed by the ordinary method for leuco sulfuric acid half esters, the product dyes cellulose fibers a bright green blue of excellent fastness, especially to light.

*Example 5*

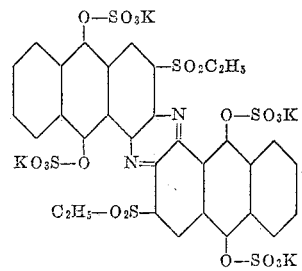

The procedures of Examples 1 to 4 are followed, alkylation, however, with diethyl sulfate instead of dimethyl sulfate as in Example 1. The final product is a brown crystalline solid, soluble in water with the green fluoresence in dilute solution and dyeing cellulose fibers by the usual dyeing procedures a bright green blue of good fastness.

*Example 6*

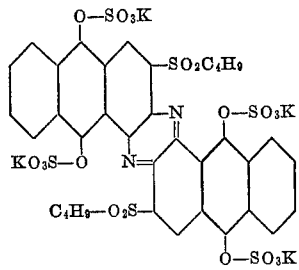

The procedures of Examples 1 to 4 are followed except that in the step described in Example 1 the 2-acetylamino-3-mercaptoanthraquinone is slurried in 1000 parts by volume of ethanol, 37 parts of butyl iodide added and the mixture stirred at the boil until the yellow precipitate of the anthraquinone butylsulfide is obtained. This is worked up by the processes of Examples 2 to 4 without modification. A brown crystalline solid is obtained, soluble in water with a green fluorescence on dilution and dyeing cellulose fibers by the usual method a bright green blue of good fastness.

*Example 7*

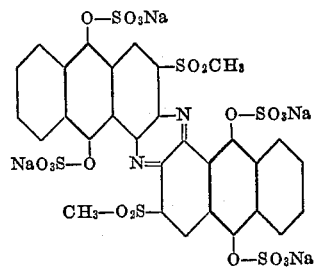

The procedures of Examples 1 to 4 are followed replacing the potassium chloride used in Example 3 and Example 4 with sodium carbonate. The much more soluble sodium salt can be isolated in this manner and can be used in the same way as the potassium salts.

We claim:

1. Sulfuric acid half esters of the leuco form of the indanthrene which in its oxidized form, has the following formula:

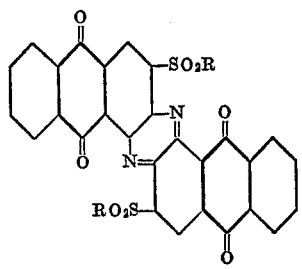

in which R is an alkyl radical of not more than four carbon atoms.

2. The tetrasulfuric acid half ester of the formula:

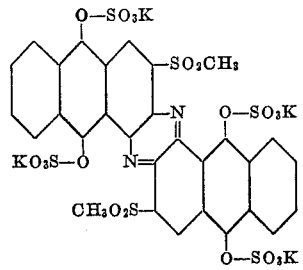

3. The tetrasulfuric acid half ester of the formula:

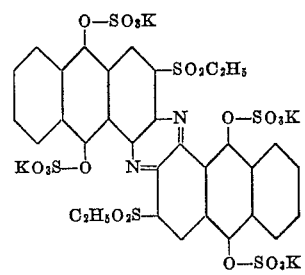

4. The tetrasulfuric acid half ester of the formula:

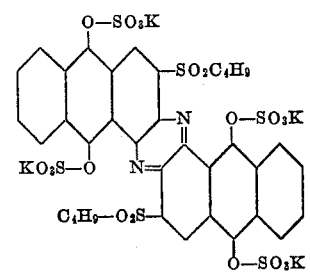

5. Compounds according to claim 1 in which the sulfuric half esters are tetrasulfuric half esters.

6. Compounds according to claim 5 in which R is methyl.

7. Compounds according to claim 1 in which the half esters are tetrasulfuric half esters and R is ethyl.

8. Compounds according to claim 1 in which the sulfuric acid half esters are tetrasulfuric acid half esters and R is butyl.

No references cited.